United States Patent

Liu et al.

[11] Patent Number: 5,953,141
[45] Date of Patent: Sep. 14, 1999

[54] DYNAMIC OPTICAL ADD-DROP MULTIPLEXERS AND WAVELENGTH-ROUTING NETWORKS WITH IMPROVED SURVIVABILITY AND MINIMIZED SPECTRAL FILTERING

[75] Inventors: Karen Liu, Montclair, N.J.; Weyl-kuo Wang, Stamford, Conn.; Chaoyu Yue, North Tarrytown, N.Y.

[73] Assignee: International Business Machines Corporation

[21] Appl. No.: 09/135,585

[22] Filed: Aug. 18, 1998

Related U.S. Application Data

[62] Division of application No. 08/724,879, Oct. 3, 1996.
[51] Int. Cl.⁶ .................................................... H04J 14/02
[52] U.S. Cl. .............................. 359/124; 359/128; 385/24
[58] Field of Search .................................. 359/124–125, 359/128, 139; 385/24

[56] References Cited

U.S. PATENT DOCUMENTS

| | | | |
|---|---|---|---|
| 5,493,625 | 2/1996 | Glance | 385/24 |
| 5,612,805 | 3/1997 | Fevrier et al. | 359/124 |
| 5,754,321 | 5/1998 | Giles et al. | 359/124 |

Primary Examiner—Kinfe-Michael Negash
Attorney, Agent, or Firm—Kevin M. Jordan

[57] ABSTRACT

A method and apparatus for constructing an optical wavelength-routing network in which each network node is a dynamic add-drop multiplexer (OADM) with minimized spectral filtering effect on pass-through channels and survivability upon power failure. By using cascaded tunable reflection filters as the building blocks, strictly add-drop non-blocking OADMs for single input/output fibers, double input/output fibers, and 3 input/output fibers can be constructed for application to unidirectional and bidirectional ring networks and mesh networks of arbitrary degree. Methods and apparatus for minimizing various types of out-of-band and in-band crosstalk occurring within the dynamic OADMs are also described.

8 Claims, 17 Drawing Sheets

DYNAMIC OPTICAL ADD-DROP MULTIPLEXERS AND WAVELENGTH-ROUTING NETWORKS WITH IMPROVED SURVIVABILITY AND MINIMIZED SPECTRAL FILTERING

This is a division of application Ser. No. 08/724,879, filed Oct. 3, 1996.

FIELD OF THE INVENTION

The present invention relates generally to a fiber-optic communications system, and particularly to a network which uses wavelength-division multiplexing.

BACKGROUND

In wavelength-division multiplexed (WDM) fiber-optic systems, multiple wavelengths are carried on a common fiber such that information on the wavelengths can maintain their separate integrity and be separated only before conversion from optical to electronic format. Currently, backbone point-to-point links have been implemented using multiple wavelengths to increase the fiber information-carrying capacity. For a WDM wavelength-routing network, which has a topology beyond a simple point-to-point link, it is desirable that per-wavelength routing be done at the nodes of the network (P. E. Green, "Optical Network Update," IEEE Journal on Selected Areas in Communications, vol. 14, pp. 764–779, June 1996). This has the benefits of reducing the equipment required to detect, process and re-transmit information which was intended to be passed on to the next node. To minimize handling, it is desirable to keep the information on its original wavelength or optical carrier, and to route it using optical components which distinguish based on wavelength. It is further desirable that the routing be dynamically reconfigurable such that any one wavelength could be re-routed without interruption to any other wavelength which may be already carrying information.

The simplest form of purely optical wavelength-routing node is an optical add-drop multiplexer (OADM) with single input and output fibers, in which incoming data may either be passed through the node or dropped to a local receiver. In purely optical wavelength routing, all the data on a particular wavelength per fiber is considered an inseparable data stream. If data from a particular wavelength is dropped, this wavelength is now available on the outbound direction, and hence new data can be added from a local transmitter. More complex nodes may include multiple input and output fibers that data streams need to be routed between.

There have been various proposed implementations for a wavelength-routing node, particularly an OADM. Implementations related to the present invention are described in U.S. Pat. No. 5,448,660, issued Sep. 5, 1995, entitled "Wavelength Selective Optical Switch", and U.S. Pat. No. 5,479,082, issued Dec. 12, 1995, entitled "Device for Extraction and Re-insertion of an Optical Carrier in Optical Communications Networks" both by Calvani et al. Calvani discloses a tunable optical bandpass filter and 1×1 add-drop multiplexing network. Here, there are at least two circulators per wavelength. Thus, amplifiers may be needed to compensate for losses as the number of wavelengths increases.

The principle of using reflection filters in combination with a circulator to separate WDM signals is described by L. Quetel, et al. in "Programmable Fiber Grating Based Wavelength Demultiplexer," presented at OFC, Feb. 28, 1996, paper WF6.

Many OADM implementations operate by demultiplexing all the wavelengths and then performing space-switching on a per-wavelength basis. Then, the wavelengths to be passed (rather than dropped) are re-multiplexed onto the output fiber. There are various well-known wavelength-selective devices which can implement a de/multiplexer. The de/multiplexer can be implemented by low-loss wavelength-selective devices such as gratings. The multiplexer also can be implemented by simple broad-band wavelength combiners such as a star coupler, at the expense of higher loss. For example, the architecture reported by P. A. Perrier, et al. ("4-Channel 10-Gbit/s Capacity Self-healing WDM Ring Network with Wavelength Add/drop Multiplexers," presented at OFC, Feb. 29, 1996, paper ThD-3) uses a star coupler and tunable transmission filters to separate the wavelengths prior to the space switch, and then another star coupler to re-multiplex. Other architectures use integrated waveguide grating devices to demultiplex and multiplex with minimal loss. See, for example, H. Toba, et al., "An Optical FDM-based Self-healing Ring Network Employing Array Waveguide Grating Filters and EDFA's with Level Equalizer," IEEE Journal of Selected Areas in Communications, vol. 14, pp. 800–813, June 1996. See also U.S. Pat. No. 548,850, issued Jan. 30, 1996, entitled "Tunable Add Drop Optical Filtering Method and Apparatus", by B. Glance.

There is particular interest in implementing dual-fiber ring topologies with wavelength routing network nodes to provide self-healing capability as described by both Toba and Perrier. In this case, it is essential that the signal can traverse the entire ring at least once and possibly wrap around almost two times. A SONET supports up to 16 nodes in a ring. Clearly, extensions to as many nodes as possible is highly desirable.

One key limitation in optical wavelength routing as described above is the number of nodes that can be traversed without unacceptable corruption of the information. Consider a given wavelength as it passes through successive nodes. By necessity, the demultiplexing component has a limited optical bandwidth. If used, a wavelength-selective multiplexer also has a limited bandwidth. Passing through multiple components successively narrows the effective optical passband experienced by that wavelength. Eventually, the passband may become so narrow that distortion to the information results. In the best case, the distortion occurs when the passband is comparable to the information bandwidth, but in practice it may happen much sooner. Inaccuracies in the center frequency or width of each component passband, carrier wavelength fluctuation and tolerance are factors. See, for example, N. N. Khrais, et al., "Effect of Cascaded Misaligned Optical (De)multiplexers on Multiwavelength Optical Network Performance," presented at OFC, Feb. 29, 1996, paper ThD-4. It is thus highly desirable to minimize spectral filtering effects in a wavelength-routing OADM network node. The present invention addresses such a need.

Another potential problem of the OADM implemented by conventional methods is the unpredictable results on wavelength routing upon node power failure. In some cases, the input signals can be totally lost due to, for example, the walk-away of the tunable filter in the configuration described by Perrier. The present invention addresses such a need.

SUMMARY

In accordance with the aforementioned needs, the present invention is directed to an optical add-drop multiplexer and network which can dynamically route on a per-wavelength basis with minimized spectral filtering of the pass-through wavelengths. This feature allows a wavelength to pass-through a large number of routing nodes without distortion to the information. Additionally, the dynamic OADMs constructed according to this invention have the advantage of network survivability upon node power failure.

Dropped wavelengths are assumed to be demultiplexed so they can each be separately detected with minimal crosstalk or interference from other information streams. Yet another feature of the present invention provides a state of operation for which the only narrowband wavelength selectivity experienced by the signal is at the final demultiplexing stage just prior to detection at the final node.

Still other features of the present invention advantageously reduce losses for pass-through signals. Yet other features of the present invention provide reduced add-to-add, drop-to-drop, add-to-drop, and drop-to-add crosstalk.

Accordingly, an embodiment of a 1×1 dynamic optical add/drop multiplexer (OADM) having an OADM input fiber and an OADM output fiber in accordance with the present invention includes: a demultiplexer having an output connected to a receiver; a multiplexer having an input connected to a transmitter; an output 3-port coupling mechanism; and a 1×2 tunable spectral switch (TSS). The TSS includes: an input 3-port coupling mechanism; a plurality of serially connected tunable reflection filters (TRFs) having a TRF input coupled to a second port of the input coupling mechanism; a first TSS output coupling a TRF output to a first input of the output coupling mechanism; the TSS having a TSS input coupling a first port of the input coupling mechanism to the OADM input fiber; a second input of the output coupling mechanism coupled to a multiplexer output; an output of the output coupling mechanism connected to the OADM output fiber; and, a second TSS output coupling a third port of the input coupling mechanism to a demultiplexer input.

The output coupling mechanism preferably is a 2×1 coupler for reducing spectral filtering on an add signal. Under normal operating conditions, a pass-through signal is not reflected by any tunable reflection filter. If power is interrupted to the OADM, all incoming signals are passed-through the tunable reflection filters and routed to the output fiber.

A 2×2 dynamic optical add/drop multiplexer (OADM) having two OADM input fibers and two OADM output fibers, in accordance with the present invention includes: two 1×2 tunable spectral switches (TSS); two 2×1 TSSs; two drop fibers; and two add fibers. A first 1×2 TSS has an input connected to a first OADM input, and a first output of the first 1×2 TSS is connected to a first drop fiber. A second 1×2 TSS has an input connected to a second OADM input, and a first output of the second 1×2 TSS connected to a second drop fiber. A first 2×1 TSS has a first input connected to a second output of the first 1×2 TSS. A second input of the first 2×1 TSS is connected to a first add fiber; and an output of the first 2×1 TSS is connected to a second OADM output. A second 2×1 TSS has a first input connected to a second output of the second 1×2 TSS. A second input of the second 2×1 TSS is connected to a second add fiber. An output of the second 2×1 TSS connected to a first OADM output. The 2×2 OADM also includes at least three 2×2 tunable spectral switches (TSS) which may be interposed according to one of the groups (a, or b, or c) consisting of:

(a) a first 2×2 TSS interposed between one of: (i) the two 1×2 TSSs and the OADM input fibers, or (ii) the first outputs of the 1×2 TSSs and the drop fibers; a second 2×2 TSS interposed between either: (i) the two 2×1 TSSs and the OADM output fibers, or (ii) the second inputs of the 2×1 TSSs and the add fibers; a third 2×2 TSS interposed between the 1×2 TSSs and the 2×1 TSSs; or (b) a first 2×2 TSS interposed between the two 1×2 TSSs and the OADM input fibers; a second 2×2 TSS interposed between the first outputs of the 1×2 TSSs and the drop fibers; a third 2×2 TSS interposed between either: (i) the two 2×1 TSSs and the OADM output fibers, or (ii) the second inputs of the 2×1 TSSs and the add fibers; or (c) a first 2×2 TSS interposed between either: (i) the two 1×2 TSSs and the OADM input fibers, or (ii) the first outputs of the 1×2 TSSs and the drop fibers; a second 2×2 TSS interposed between the two 2×1 TSSs and the OADM output fibers; and a third 2×2 TSS interposed between the second inputs of the 2×1 TSSs and the add fibers.

Preferably, each 2×1 TSS includes: an isolator; a plurality of serially connected tunable reflection filters (TRFs); and a 3-port circulator; wherein a first input of the 2×1 TSS is connected to an input of the isolator; a second input of the 2×1 TSS is connected to a first port of the circulator; wherein the TRFs have a first end connected to an output of the isolator, and a second end of the TRFs are connected to a second port of the circulator. A third port of the circulator is connected to the output port of the 2×1 TSS.

The 2×2 TSS preferably includes a plurality of tunable reflection filters; and two circulators; the first input of the 2×2 TSS connected to the first port of the input circulator; the second input of the 2×2 TSS connected to the first port of the output circulator; and a plurality of serially connected tunable reflection filters having a first end connected to the second port of the input circulator and a second end connected to the second port of the output circulator, and the third port of the input circulator connected to the first output port of the 2×2 TSS, and the third port of the output circulator connected to the second output port of the 2×2 TSS.

BRIEF DESCRIPTION OF THE DRAWINGS

Other features and embodiments of the present invention will become clear to those of skill in the art by reference to the accompanying detailed description and drawings, wherein.

DETAILED DESCRIPTION

Figure 1:
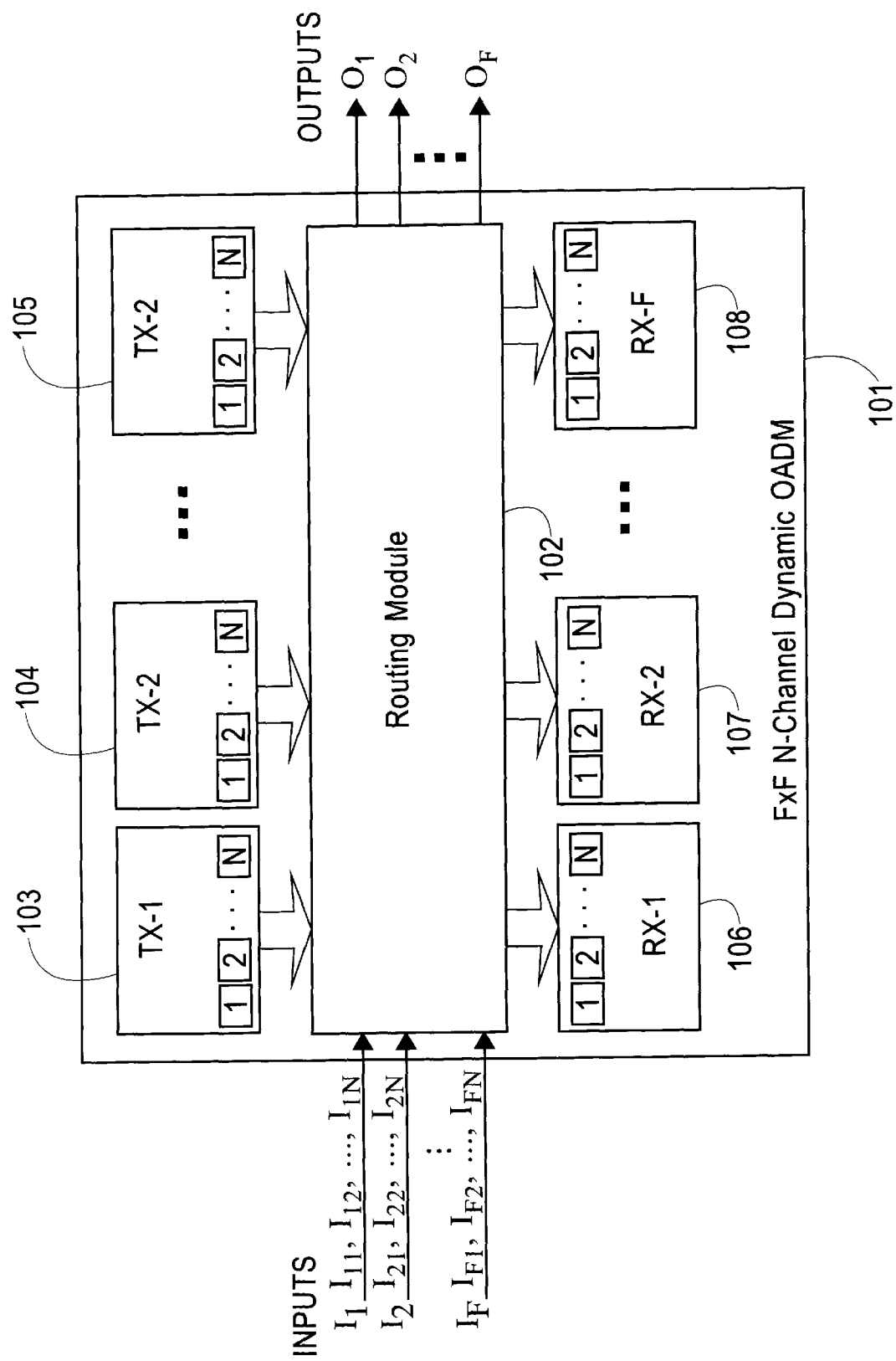
FIG. 1 is a block diagram of a general dynamic optical add-drop multiplexer (OADM) having features of the present invention.

FIG. 1 illustrates a block diagram of a multi-wavelength dynamic optical add-drop multiplexer (OADM) 101 having features of the present invention. As depicted, the OADM 101 includes up to F inputs ($I_1$ to $I_F$) and F outputs ($O_1$ to $O_F$). Each input $I_m$ carries up to N wavelength multiplexed channels ($I_{m1}, I_{m2}, \ldots, I_{mN}$) with $I_{mk}$ at the wavelength $\lambda_k$. The OADM 101 includes a routing module 102 in accordance with the present invention. For maximum add-drop capability, the OADM 101 may include up to F transmitter arrays 103–105 and F receiver arrays 106–108. Each array contains N transmitters or receivers. The OADM 101, referred to as an F×F N-channel dynamic OADM, is capable of either dynamically dropping any input channel $I_{mk}$ (1 m F, 1 k N) to one of the receivers or passing it to one of the outputs. To avoid collisions, any two input channels at the same wavelength should not be passed to the same output. Simultaneously, when any output $O_m$ has an empty wavelength slot due to channel dropping, a new channel at that wavelength could be added from the transmitter and directed to $O_m$. The OADM is dynamic if the add-drop condition for any channel is reconfigurable at a later time.

In order to achieve per-wavelength add-drop control, the routing module 102 must include wavelength-selective filter devices. As will be described with reference to FIG. 4, the routing module 102 according to the present invention has features which minimize spectral filtering effects from each node and thus enhances network transparency and enables signal channels to be routed through as many nodes as possible.

Figure 2:
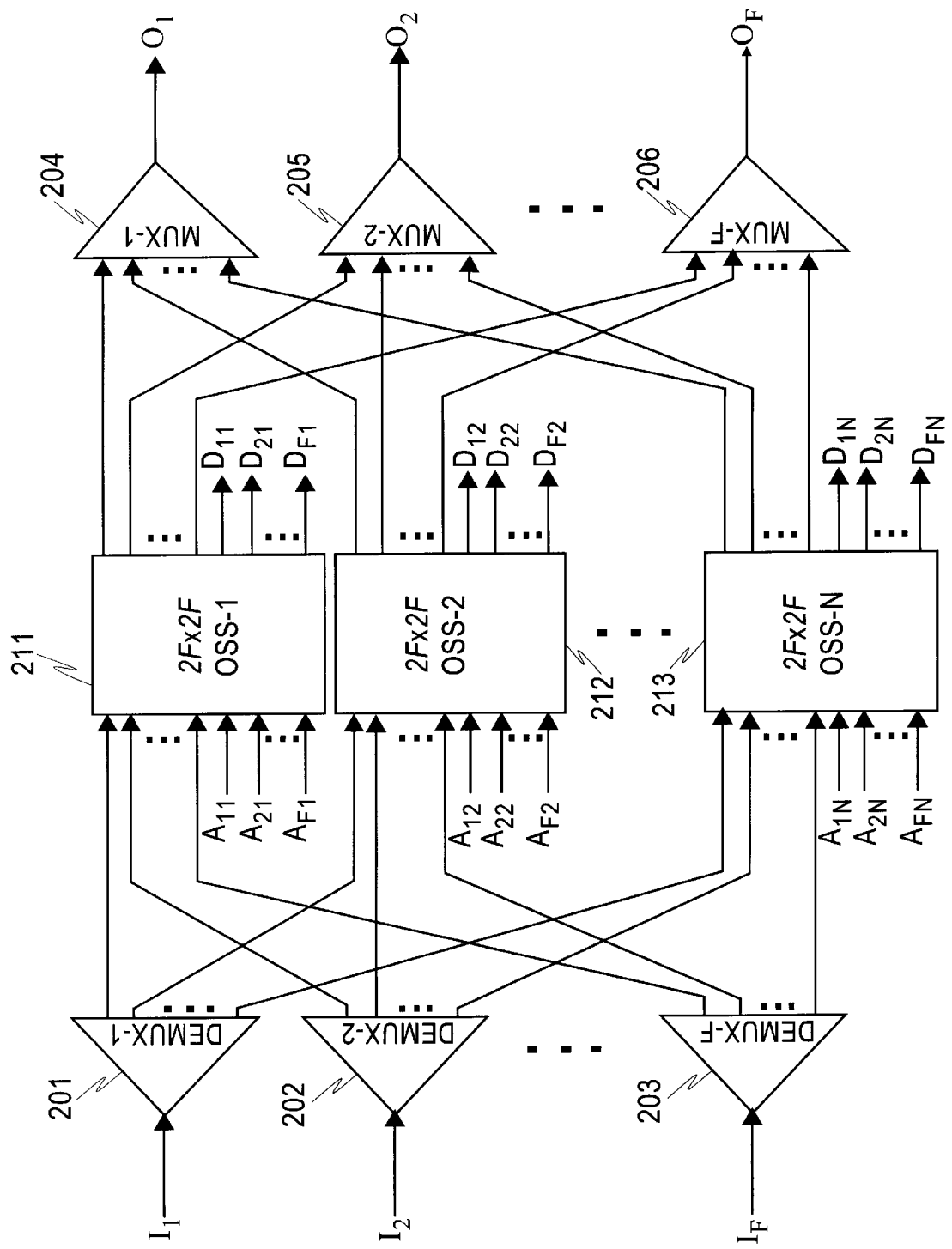
FIG. 2 is a system diagram of a conventional method for implementing the routing module of FIG. 1 in a dynamic OADM.

FIG. 2 illustrates a system diagram of a conventional method for implementing the routing module 102 (FIG. 1) for an F×F N-channel dynamic OADM by using F demultiplexers (DEMUX) 201–203, N 2F×2F optical space switches (OSS) 211–213, and F multiplexers (MUX) 204–206 as the routing module 102. Channels from input $I_m$ are separated by DEMUX-m with channel $I_{mk}$ sent to OSS-k. Similarly channel $A_{mk}$, defined as the add channel at the wavelength $\lambda_k$ from TX-m, is also sent to OSS-k. Depending on the state of OSS-k, channel $I_{mk}$ can either go to one of the drop ports ($D_{1k}, D_{2k}, \ldots, D_{Fk}$) or exit the OADM by first going through one of the multiplexers 204–206. The add-drop at each channel wavelength is controlled by the space switches 211–213 in the wavelength-separated space between the DEMUX and MUX. Consequently any input channel that is routed through the OADM has to pass the narrowband filters inherent in the DEMUX and the MUX. Although the spectral filtering effects of the MUX could be eliminated by using a broad-band coupler (at the expense of increased loss), the filtering effect of the DEMUX cannot be eliminated, regardless of the type of wavelength-selective device utilized.

Figure 3:
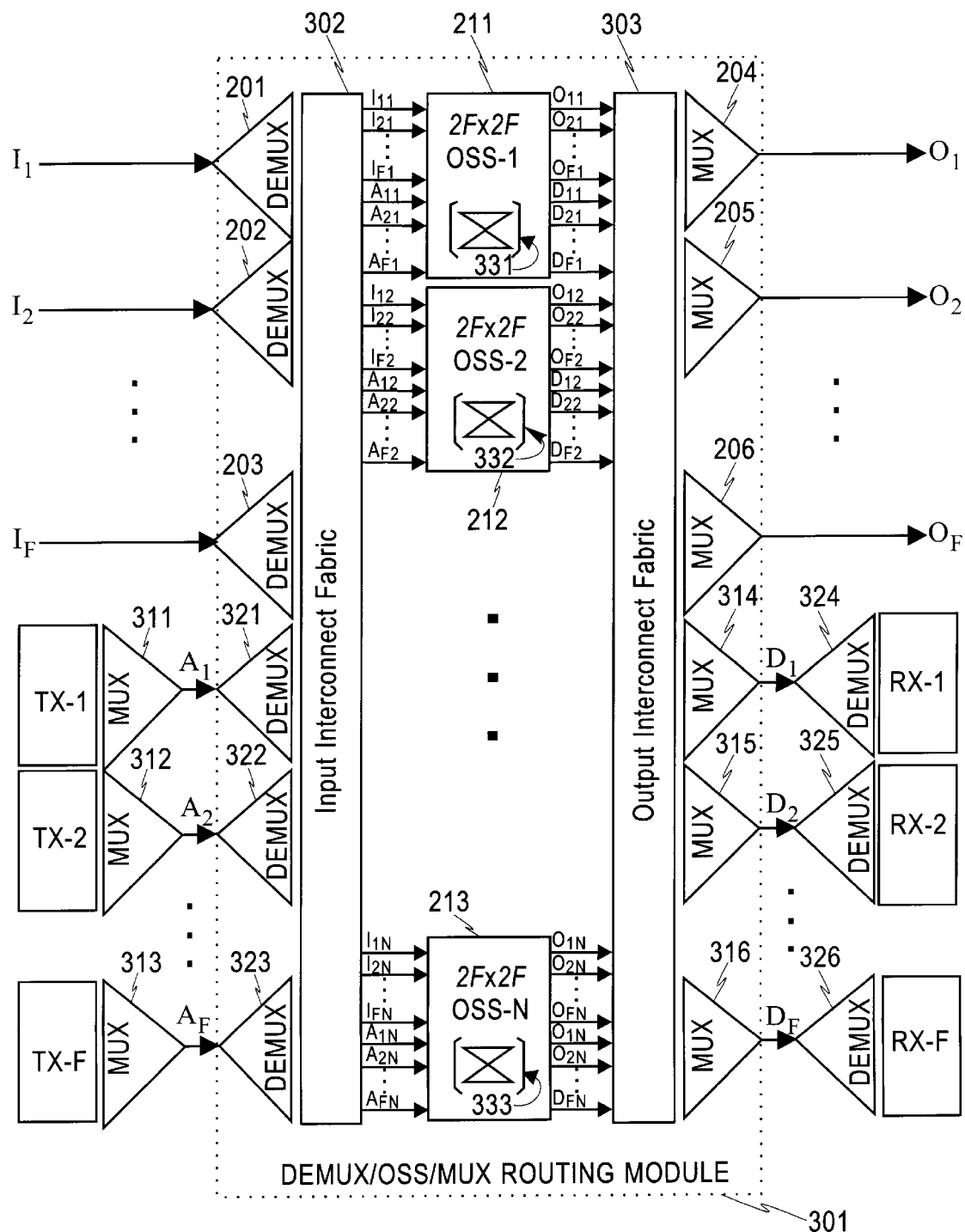
FIG. 3 is an equivalent system diagram to the system of FIG. 2 that can be transformed to a dynamic OADM in accordance with the present invention.

FIG. 3 represents an equivalent system diagram of the dynamic OADM of FIG. 1 where the routing module 102 is implemented by the conventional method of FIG. 2. As depicted, the transmitters TX-1–TX-F add signals are assumed to be first multiplexed by the additional multiplexers 311–313 to form the multi-channel signals $A_1$ to $A_F$, which are immediately demultiplexed by the demultiplexers 321–323. Signal $A_m$ is demultiplexed into $A_{m1}$ to $A_{mN}$. Similarly, the drop signals are assumed to be first multiplexed by multiplexers 314–316 to form the multi-channel signals $D_1$ to $D_F$ which reach the receiver arrays RX-1–RX-F after passing through demultiplexers 324–326. Within the routing module 301, the interconnections from the outputs of demultiplexers 201–203 and 321–323 to the inputs of all OSS-k and from the outputs of all OSS-k to inputs of multiplexers 204–206 and 314–316, as illustrated by the crossed lines in FIG. 2, are represented in FIG. 3 by the input interconnect fabric 302 and the output interconnect fabric 303. Each of the 2F multi-channel signals $I_1$ to $I_F$ and $A_1$ to $A_F$ passes through the cascade of a DEMUX, an OSS, and a MUX. The module 301 is thus called a DEMUX/OSS/MUX routing module. Note that all the 2F×2F optical space switches 211–213 can always be constructed using basic 2×2 space switches, as depicted therein by switch-like symbols enclosed by brackets 331–333. In general there are multiple configurations which may implement a 2F×2F space switch using 2×2 switches. To properly achieve the add-drop and routing functions for the F×F N-channel dynamic OADM, the 2F×2F space switches must satisfy the following conditions: (1) any two switches are independently controllable for per-wavelength routing; (2) when a signal $I_{mk}$ is dropped, it can be dropped to any drop port $D_{nk}$ (1 n F); (3) when a signal $I_{mk}$ is passed through, it can be passed to any output port $O_{nk}$ (1 n F); (4) when a signal $A_{mk}$ is added, it can be added to any output port $O_{nk}$ (1 n F); (5) at most one channel is routed to any output; (6) at most one channel is routed to any drop port; and (7) establishing a new connection from input/add to output/drop has no effect on existing connections. These conditions are referred to in the following as strictly add-drop non-blocking (SADNB). It is assumed that routing the output of a local transmitter to a local receiver is not useful since this information could have been transferred within the electrical domain.

Figure 4:
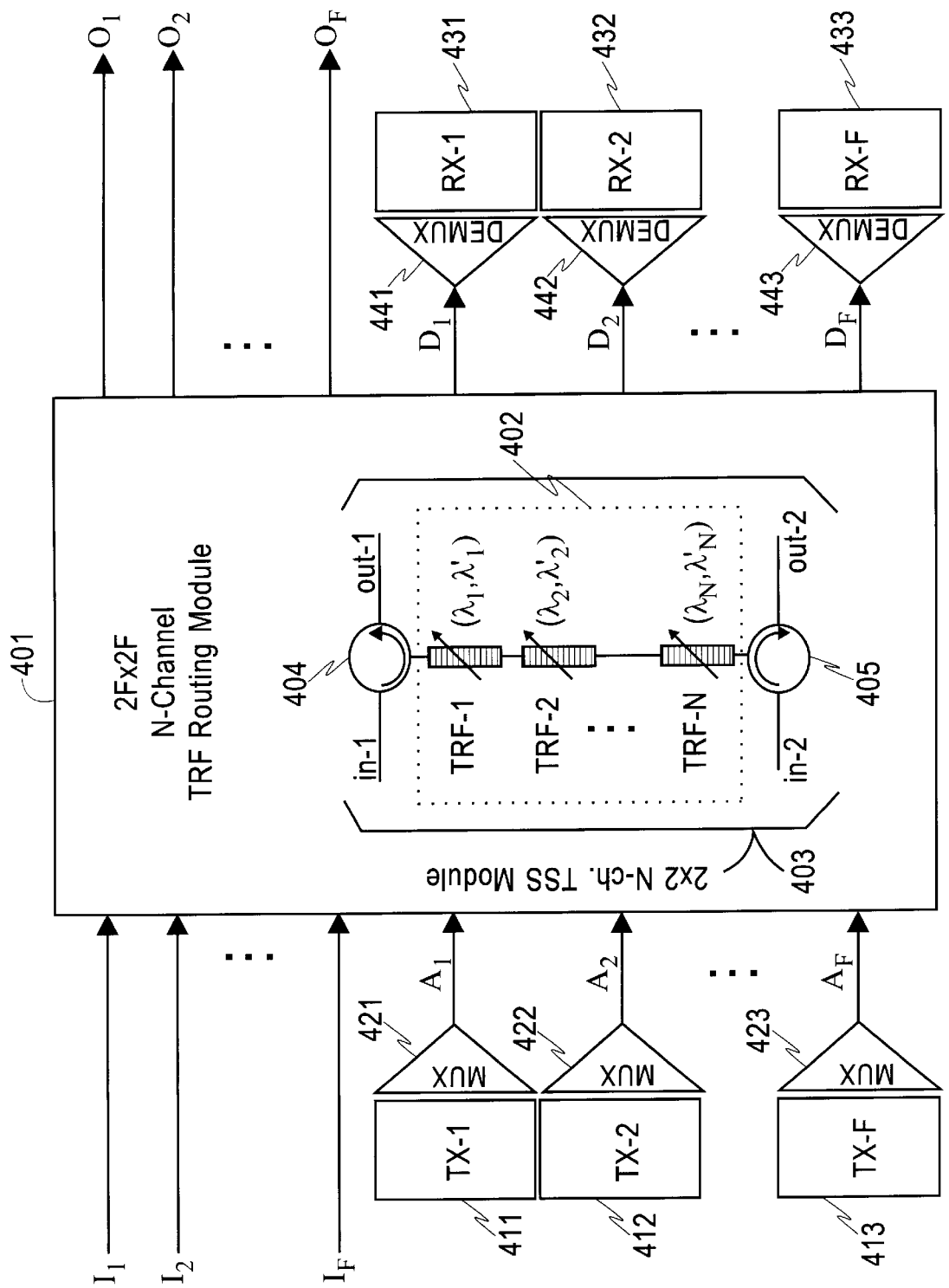
FIG. 4 is a system diagram of an embodiment of a general F×F N-channel dynamic OADM (with F inputs and F outputs) and tunable reflection filter (TRF) routing module according to the present invention.

FIG. 4 depicts a system diagram of an F×F N-channel dynamic OADM having features of the present invention in which the conventional DEMUX/OSS/MUX routing module 301 is transformed into a new tunable-reflection-filter (TRF) routing module 401 constructed from multiple TRF devices TRF-1 . . . TRF-N. The TRF is an optical filter device with a narrow reflection bandwidth whose center wavelength can be tuned by mechanical, thermal, or electronic means. The principle of using reflection filters in combination with a circulator to separate WDM signals is described by L. Quetel, et al. in "Programmable Fiber Grating Based Wavelength Demultiplexer," presented at OFC, Feb. 28, 1996, paper WF6, which is hereby incorporated by reference in its entirety. The TRF is preferably a low-loss tunable reflection filter, such as an in-fiber UV-written Bragg grating, which may exhibit lower insertion loss for pass-through channels.

Referring again to FIG. 4, assume maximum add-drop capability such that N TRFs are connected in series with TRF-k controlling the add-drop of channel $\lambda_k$. For a given WDM channel wavelength spacing $\Delta\lambda = \lambda_{k+1} - \lambda_k$, the TRF bandwidth should be small enough to reflect only $\lambda_k$ and pass all the other N−1 channels in the ON state while passing all N channels in the OFF state. As depicted, the TRF module 402 includes N cascaded TRFs, wherein each filter TRF-k controls the reflection (when the TRF center wavelength is tuned at $\lambda_k$, the ON state) or transmission (when the TRF center wavelength is detuned to that is away from $\lambda_k$, the OFF state) of the channel at $\lambda_k$. Therefore, along with the two circulators 404 and 405, $\lambda_k$ will travel from in-1 to out-1 or from in-2 to out-2 when TRF-k is ON (corresponding to a BAR state in a 2×2 space switch) and travel from in-1 to out-2 or in-2 to out-1 when TRF-k is OFF (corresponding to a CROSS state of a 2×2 space switch). In practice can be constructed such that a TRF-k in the OFF state has a flat response for all N channels. The module 403 in the bracket thus functions as a 2×2 N-channel tunable spectral switch (TSS) with the transmission or reflection of all channels being independently controllable. Because the module 403 achieves independent wavelength switching with all channels multiplexed, it is concluded that the DEMUX/OSS/MUX module 301 of FIG. 3 can be transformed into the 2F×2F N-channel TRF module 401 of FIG. 4 with internal 2×2 TSS modules connected exactly in the same fashion that the 2×2 space switches are connected in any OSS-k of FIG. 3. Outside the TRF routing module 401, the arrangement of array transmitters 411–413, transmitter multiplexers 421–423, array receivers 431–433, and receiver demultiplexers 441–443 are exactly the same as outside the module 301 in FIG. 3.

Figure 5:
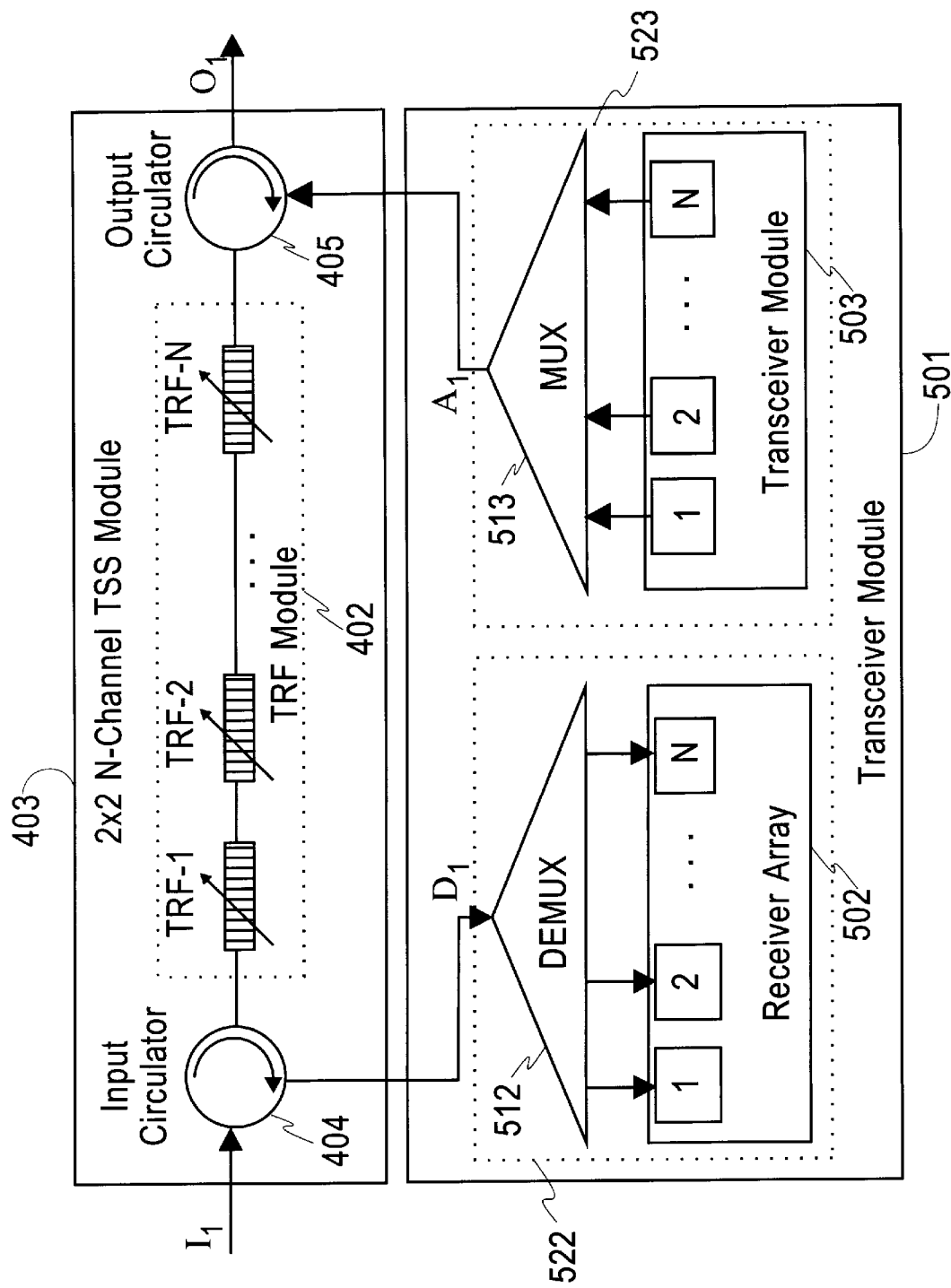
FIG. 5 is a system diagram of an embodiment of a dynamic OADM with F=1 that is constructed according to this invention.

FIG. 5 illustrates a system diagram of the simplest 1×1 N-channel dynamic OADM, a node for a single fiber uni-directional optical ring or bus network, constructed according to this invention, by setting F=1 in FIG. 4. Any channel $I_{1k}$ at a wavelength $\lambda_k$ can be dropped to port $D_1$ when TRF-k is ON, and conversely, passed to the output $O_1$ when TRF-k is OFF. Dropped channel $I_{1k}$ goes to the k-th receiver in the receiver array 502 by first passing through the DEMUX 512. Simultaneously, the k-th transmitter in the transmitter array 503 can add a channel at the wavelength $\lambda_k$ which passes through the MUX 513, reflected by TRF-k and exits at the circulator 405 output $O_1$. Since any channel that is routed from $I_1$ to $O_1$ experiences the out-of-band flat response of TRF-1 to TRF-N, the spectral filtering effect is minimized, thus reducing system penalties when the signal is routed through a large number of nodes in a ring or bus network. The filtering effects of the DEMUX and the MUX is less of a problem because the signal experiences such effects only once, i.e. when it is dropped or added. A second concern in implementing the OADM of FIG. 5 is the in-band and out-of band crosstalk that may contaminate the signal channel due to imperfect isolation of practical TRFs and/or circulators. Consider, as an example of out-of-band crosstalk, that TRF-1 is ON and TRF-2 is OFF so that ideally $I_{11}$ is dropped to port $D_1$ and $I_{12}$ passes through. In practice $I_{12}$ can be slightly reflected by TRF-2 even in the OFF state. The DEMUX 512, however, provides a desirable second isolation stage. The in-band crosstalk on the dropped channel $I_{11}$ can result from the leakage of $A_{11}$ (when transmitting) through TRF-1 in the ON state. This type of crosstalk is referred to as add-to-drop crosstalk. Similarly, $I_{11}$ in reality can leak through TRF-1 and result in drop-to-add crosstalk on $A_{11}$.

Figure 6:
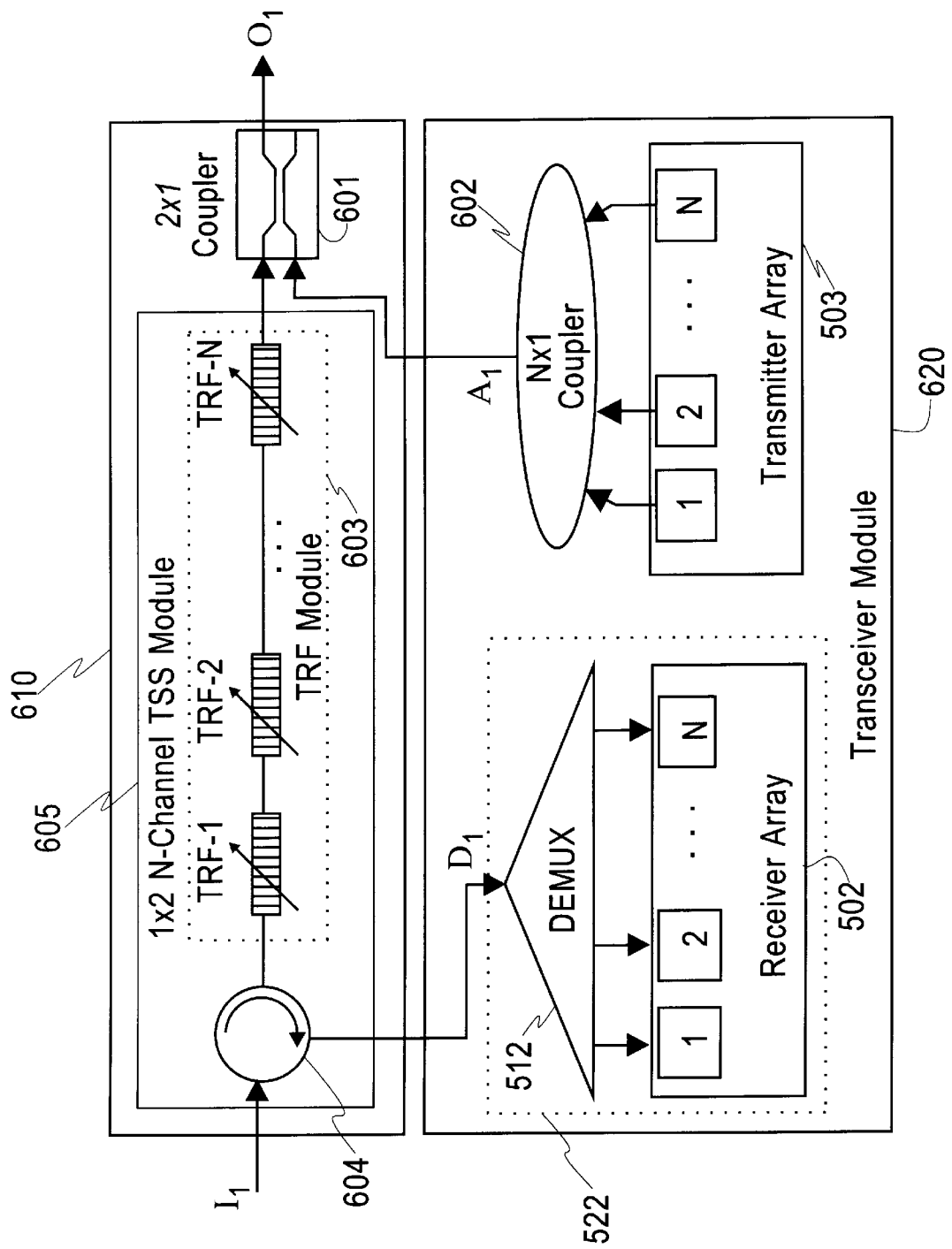
FIG. 6 is a system diagram of a second embodiment of a modified dynamic OADM with F=1 that is constructed according to this invention.

FIG. 6 shows a system diagram of a dynamic OADM according to the present invention (which has been modified from FIG. 5) to remove add-to-drop crosstalk and also to eliminate spectral filtering effects on add signals. The add-to-drop crosstalk is removed by replacing the output circulator 405 in FIG. 5 by a 2×1 directional coupler 601. Here, the input circulator 604 and the TRF module 603 actually function as a 1×2 N-channel TSS module 605. To further eliminate spectral filtering on the add signals, an N×1 star coupler 602 can be used in place of the MUX 513. The reduction of the crosstalk and spectral filtering is, however, achieved at the expense of additional power loss.

Figure 15A:
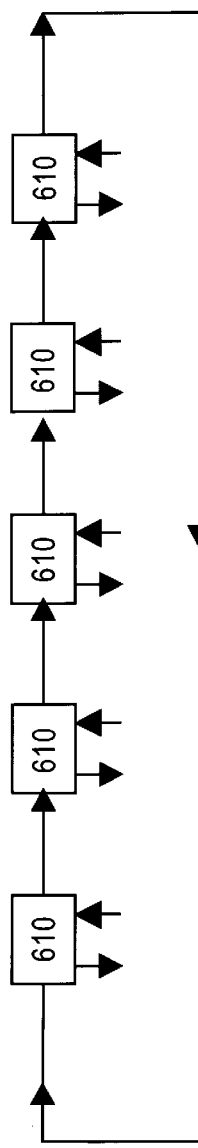
FIG. 15a–15c illustrate three types of single-fiber ring (or bus) networks comprising the 1×1 and 2×2 OADMs constructed according to this invention.
Figure 15B:
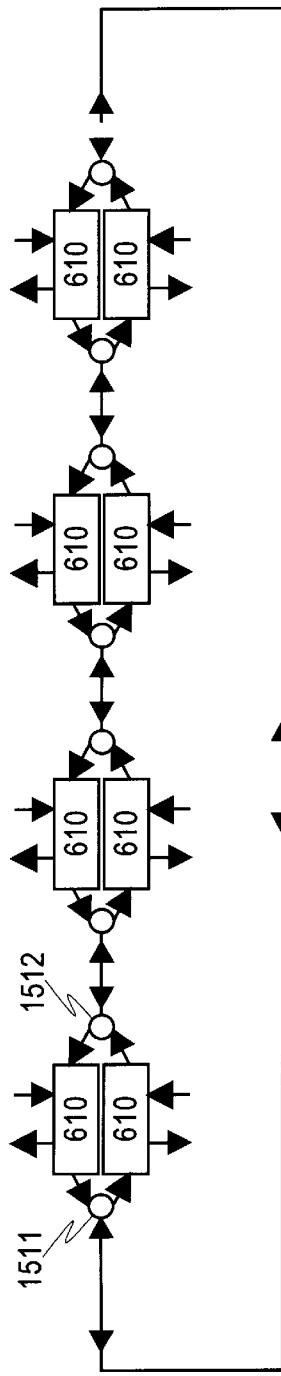

As will be discussed with reference to FIG. 15b, two independent 1×1 OADMs such as those illustrated by FIG. 5 or FIG. 6 could be arranged in parallel to form a WDM ring network with bidirectional (clockwise and counter-clockwise) signal transmission capability. Each 1×1 OADM independently handles the channel add-drops for one direction. In this arrangement there is no interaction of signals between the two OADMs. Moreover, circulators can be employed at the inputs and outputs of the two OADMs to convert the two inputs or two outputs to a single fiber, which results in the single-fiber bi-directional transmission between the ring nodes.

Consider now a more common 2×2 N-channel dynamic OADM with inputs $I_1$ and $I_2$, outputs $O_1$ and $O_2$, add ports $A_1$ and $A_2$, and drop ports $D_1$ and $D_2$ obtained from FIG. 3 for F=2. Assume that in a dual-fiber bidirectional ring network discussed below, $I_1$ to $O_1$ corresponds to a transmission in one direction, while $I_2$ to $O_2$ corresponds to a transmission in the other. In contrast to the two independent 1×1 OADMs discussed above, the 2×2 OADM can dynamically drop any input channel to either $D_1$ or $D_2$ and route any add channel to either $O_1$ or $O_2$. The 2×2 N-channel OADM, when constructed by the conventional configuration of FIG. 3, will include N 4×4 optical space switches.

Figure 7A:
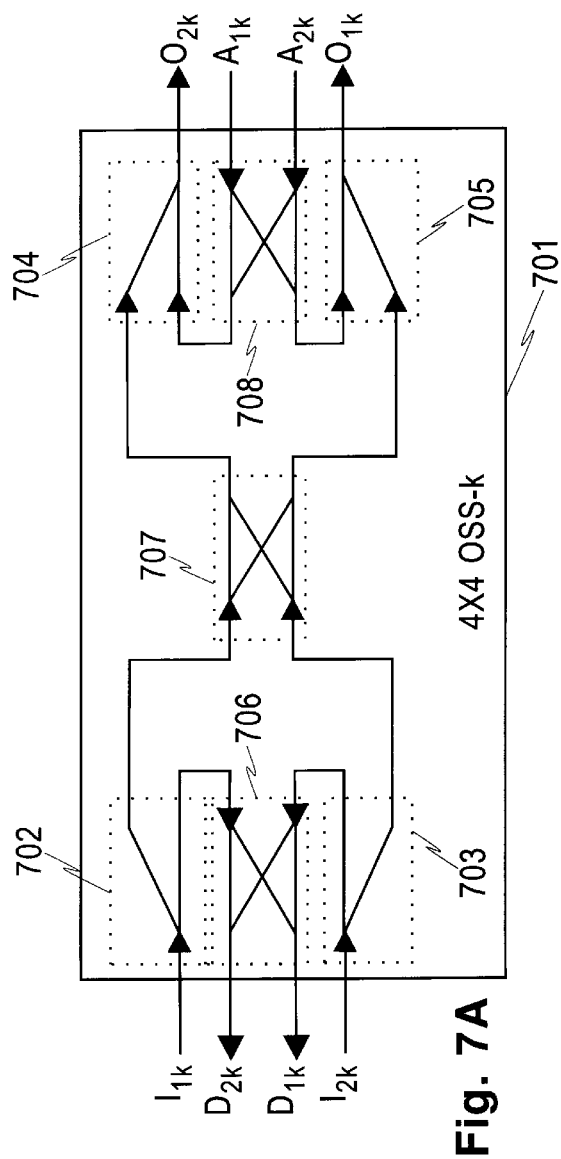
FIG. 7a and 7b depict examples of strictly add-drop non-blocking (SADNB) configurations of the 4×4 optical space switch (OSS) in FIG. 3 for F=2.
Figure 7B:
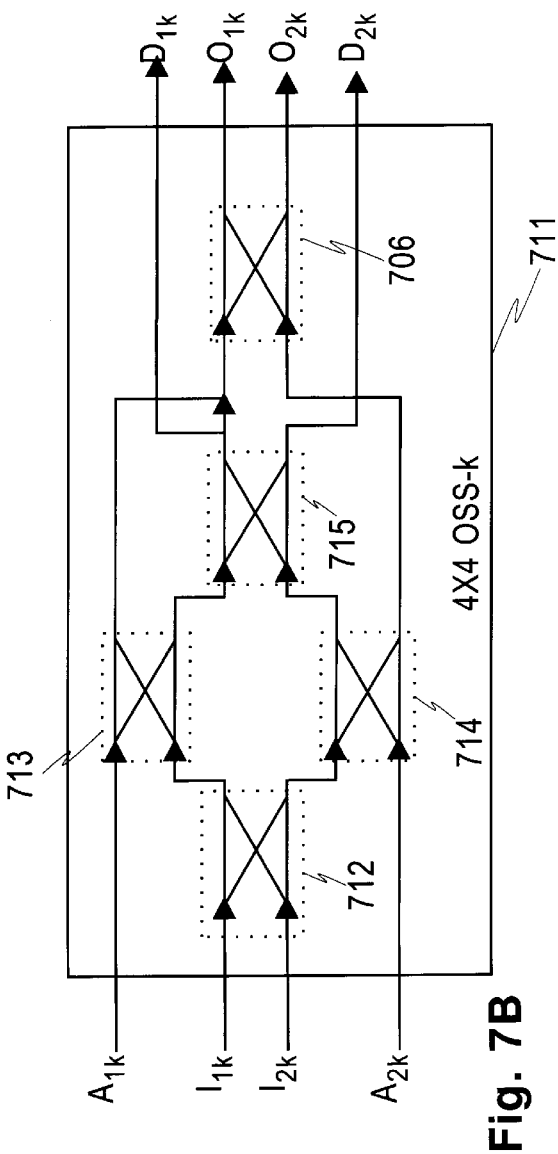

FIG. 7a and 7b illustrate two possible configurations of 4×4 space switches for channels at $\lambda_k$, constructed using 2×2 space switches. Note that 1×2 and 2×1 space switches can be regarded as 2×2 switches with one unused input or output. It is straight forward to verify that both FIG. 7a and 7b satisfy the conditions of SADNB.

Figure 8:
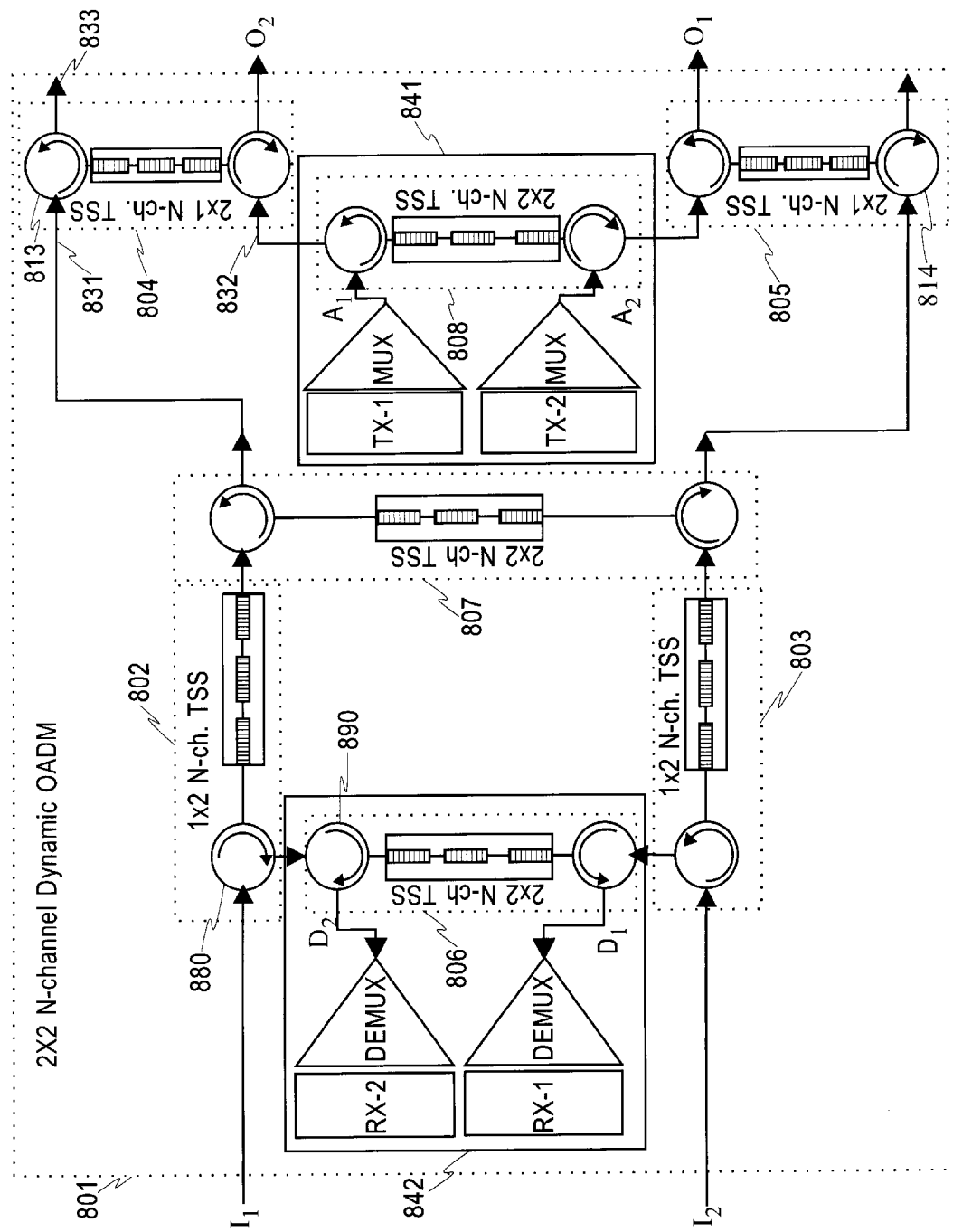
FIG. 8 is a system diagram of an embodiment of a 2×2 N-channel dynamic OADM that is constructed according to this invention.

FIG. 8 illustrates a 2×2 N-channel dynamic OADM 801 that is constructed according to this invention. The OADM 801 may be obtained by transforming FIG. 3 to FIG. 4, given the 4×4 OSS configuration 701 in FIG. 7a, in the following steps. The N-channel TSS modules 802–808 have a one-to-one correspondence to the space switches 702–708 in FIG. 7a. The TSS cross-drop module 806 enables $I_1$ or $I_2$ to be dropped to either $D_1$ or $D_2$. The TSS cross-add module 808 enables $A_1$ or $A_2$ to be added to either $O_1$ or $O_2$. Similarly the TSS cross-pass module 807 enables $I_1$ or $I_2$ to be routed to either $O_1$ or $O_2$. These three functions are transformed from the cross-drop switch 706, cross-add switch 708, and the cross-pass switch 707 in the 4×4 OSS-k 701 of FIG. 7a. The two 1×2 switches 702 and 703 and 1×2 TSS modules 802, 803 are functionally similar and are called drop-control switches. The 2×1 switches 704 and 705 and 2×1 TSS modules 804, 805 are functionally similar and are called add-control switches. The dynamic OADM 801 is SADNB for all N wavelengths since the 4×4 OSS of FIG. 7a is SADNB for $\lambda_k$. Note that the 1×2 TSS modules 802 and 803 each need only one circulator due to the absence of a second input. The circulators 813 and 814 in the 2×1 TSS modules 804 and 805, however, are preferably kept because they can greatly reduce both add-to-drop and drop-to-add types of in-band crosstalk. Consider the four signals at $\lambda_k$, i.e. $I_{1k}, I_{2k}, A_{1k}, A_{2k}$, and both $I_{1k}$ and $I_{2k}$ are dropped by setting TRF-k in modules 802 and 803 both to ON state. Channel $I_{1k}$ can leak through TRF-k of module 802, reflected by TRF-k in module 807 assumed at ON state, and appear at port 831 of the 2×1 TSS module 804. To add a channel to output $O_2$ from port 832, TRF-k in module 804 will be set at ON state. Therefore the drop-to-add crosstalk from port 831 will be reflected to the unused output 833. Simultaneously the add signal that leaks through TRF-k in module 804 will also exit at 833 and thus the add-to-drop crosstalk is also avoided. The circulator 814 in the TSS module 805 for $O_1$ functions identically in crosstalk reduction. Alternatively, the circulators 813 and 814 can each be replaced by an isolator. Finally imperfect isolation of the TSS module 808 will cause in-band crosstalk between ports $A_1$ and $A_2$ (referred to as add-to-add crosstalk) in the switchable transmitter arrays 841. Similarly there is drop-to-drop crosstalk in the switchable receiver arrays 842. Those skilled in the art will appreciate that adjacent circulators can be combined. For example, the 3-port circulator 880 coupled to the input port $I_1$ and the adjacent 3-port circulator 890 could be replaced by a single 4-port circulator.

Those skilled in the art will also appreciate that in the dynamic OADM 801 constructed according to this invention, since input channels passing through the OADM ring node (from $I_1$ to $O_1$ or from $I_2$ to $O_2$) go through the out-of-band flat response of all TRF modules in the path, spectral filtering effects are therefore advantageously minimized. Another desirable feature for a ring network that is built based on nodes of the OADM 801 is that the network can survive when node power fails: all TRFs in the OADM can be designed to consume power only in the ON state such that all input channels will be routed through the node during a power failure (all TRFs OFF) with channel add/drop automatically suppressed.

Figure 9:
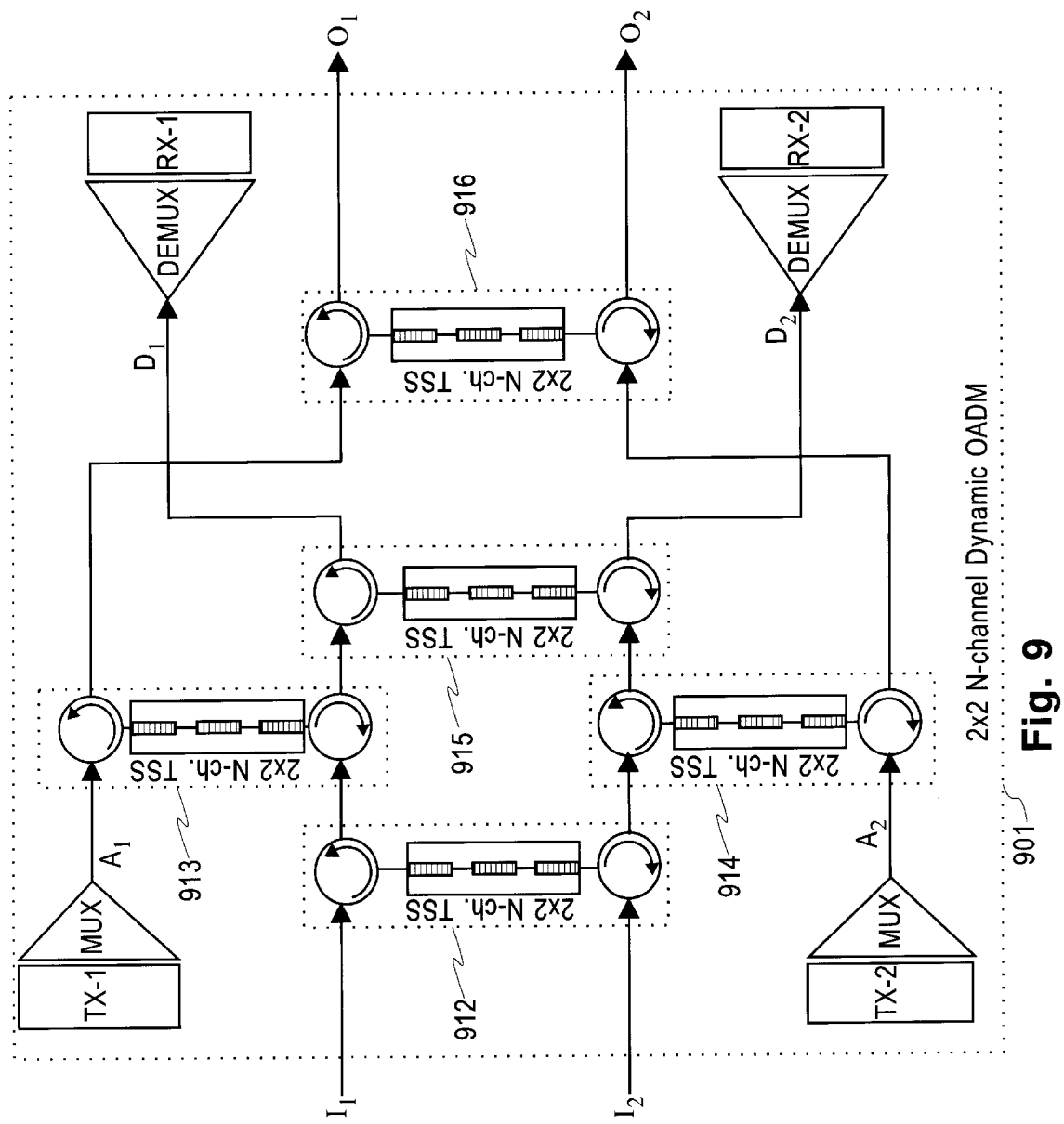
FIG. 9 is a system diagram of a second embodiment of a 2×2 N-channel dynamic OADM that is constructed according to this invention.

FIG. 9 illustrates a second 2×2 N-channel dynamic OADM 901 that is constructed by transforming FIG. 3 to FIG. 4 given the 4×4 OSS configuration 711 as shown in FIG. 7b. The N-channel TSS modules 912–916 one-to-one correspond to the space switches 712–716 in FIG. 7b. Assuming identical TSS device imperfections, the OADM 901 has different crosstalk performance compared to that of the OADM of FIG. 8. The OADM 901 is worse in terms of both add-to-drop and drop-to-add crosstalks because the add and drop channels are isolated by only a single TSS module (913 or 914). The two OADMs have similar add-to-add and drop-to-drop crosstalk. The OADM of FIG. 9 possesses the same advantages as FIG. 8 of minimized spectral filtering for pass channels and survivability upon power failure.

Figure 10:
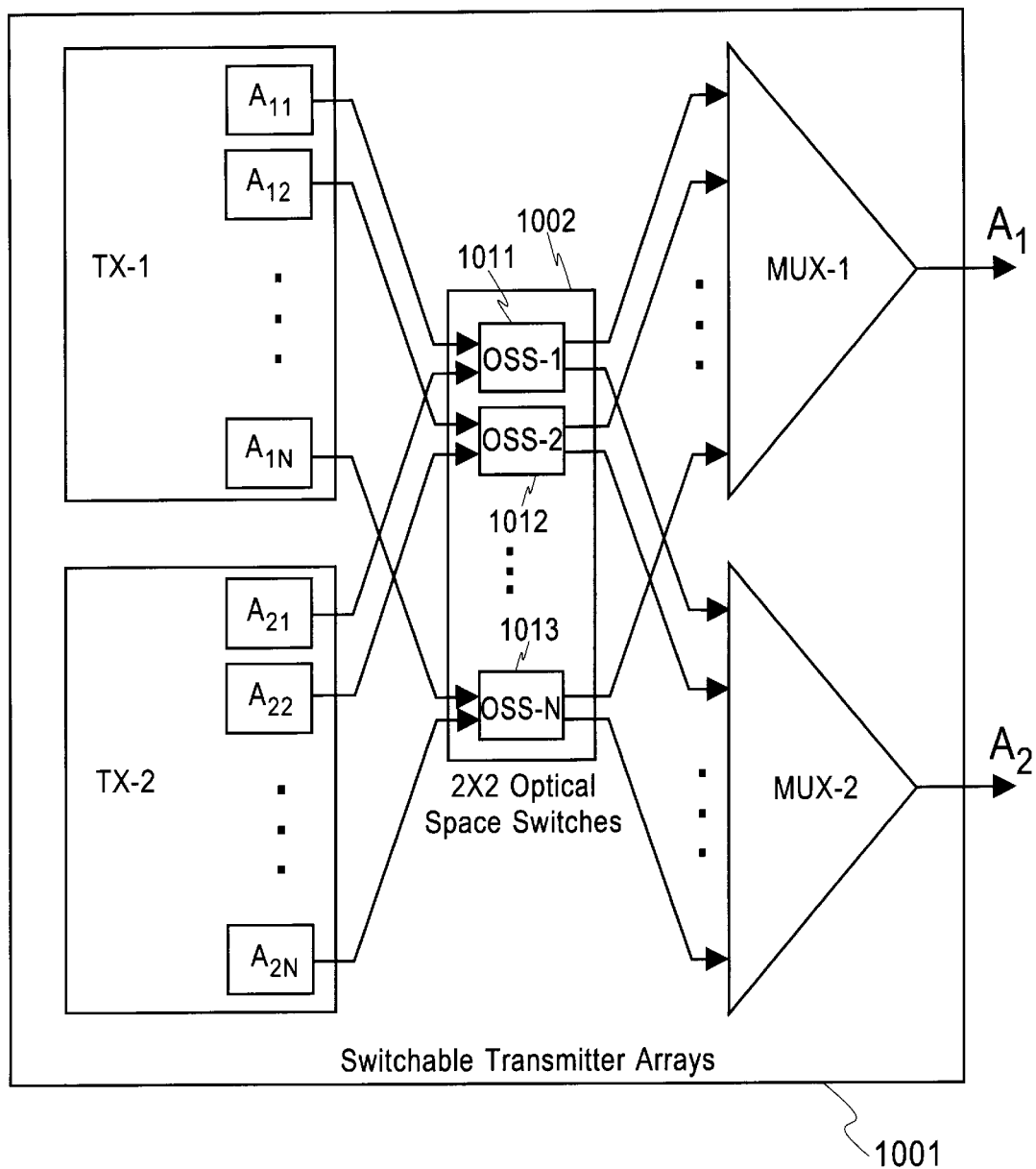
FIG. 10 illustrates an alternative embodiment for implementing switchable transmitter or receiver arrays for a 2×2 N-channel dynamic OADM.

In order to remove the add-to-add and drop-to-drop in-band crosstalks in the OADM of FIG. 8 while still preserving the features of minimized spectral filtering for pass channels and survivability upon power failure, FIG. 10 illustrates an alternative configuration 1001 for implementing just the switchable transmitter array 841 or receiver array 842 portions for F=2. The add channels $A_{1k}$ and $A_{2k}$ from TX-1 and TX-2, respectively, are space switched by 2×2 OSS array 1011–1013 before they are multiplexed. Since low-loss high-isolation (>50 dB) 2×2 space switches are commercially available, the in-band add-to-add crosstalk is essentially removed if the switchable transmitter array 841 in the OADM 801 is so modified. The configuration 1001 is readily extendible to F transmitters by using N F×F space switches as the switch assembly 1002. For arbitrary F and N, a similar configuration can be constructed and used to replace the switchable receiver arrays 842 in FIG. 8.

The 2×2 OADM 801 implemented by FIG. 8 can be understood in the following modular way on a per-wavelength basis: (1) dropping of any $I_m$ is controlled by a 1×2 TSS module, (2) adding of any $A_m$ is controlled by a 2×1 TSS module, and (3) three additional 2×2 TSS modules make possible the functions of cross-drop, cross-add, and cross-pass. These three specifications suggest the generic system configuration of FIG. 11, from which eight different SADNB 2×2 N-channel dynamic OADM configurations can be constructed according to this invention.

Figure 11:
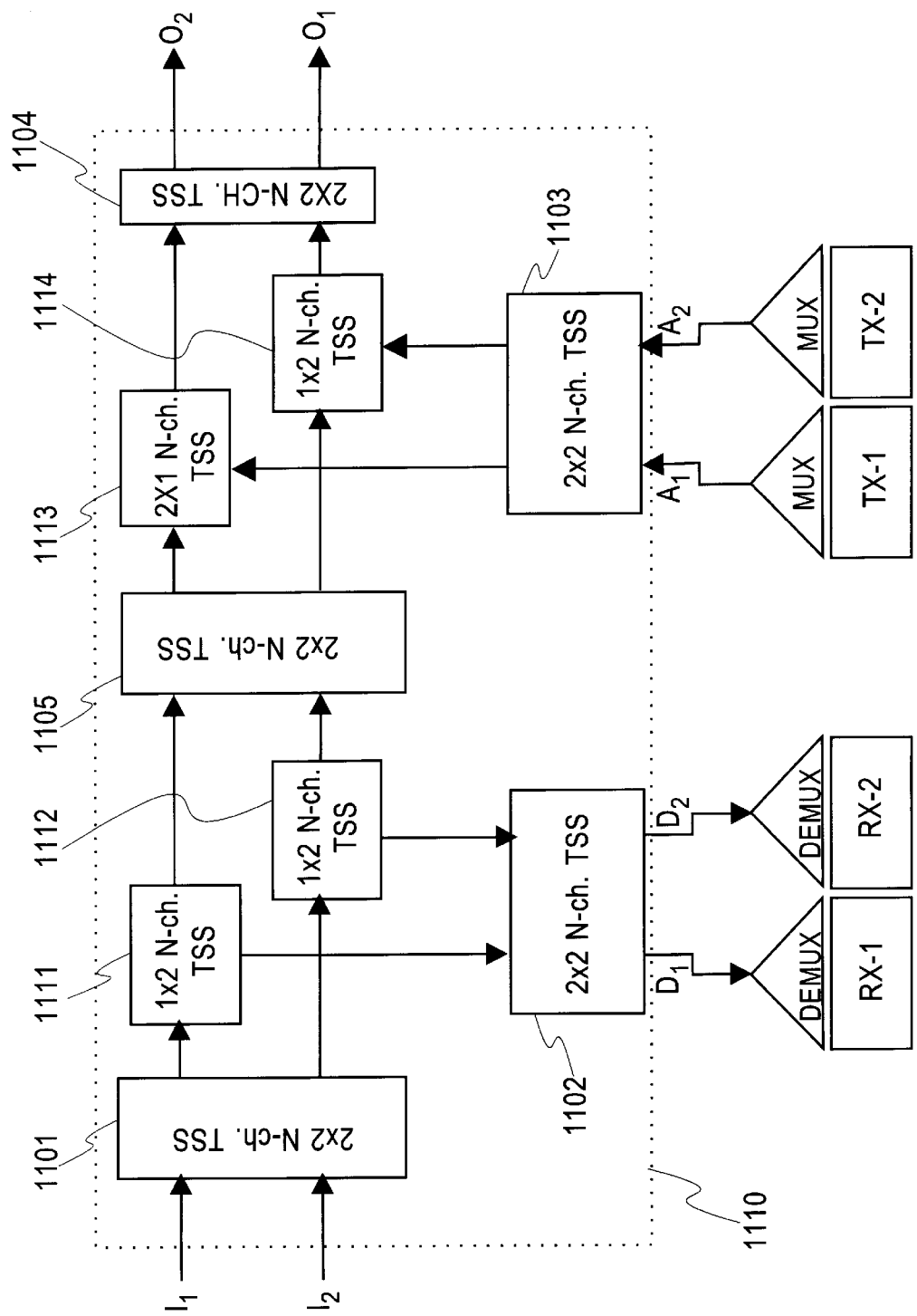
FIG. 11 describes a generic system configuration from which eight SADNB 2×2 N-channel dynamic OADMs can be derived according to this invention.

To construct an SADNB 2×2 N-channel OADM, only three out of the five 2×2 N-channel TSS modules 1101–1105 in FIG. 11 are needed. However, the cross-drop function is enabled only if at least one of the 2×2 TSS modules 1101 and 1102 is retained. Similarly the cross-add function is enabled only if at least one of 2×2 TSS modules 1103 and 1104 is retained. A third 2×2 TSS module provides the cross-pass function. Accordingly there are eight possible configurations to construct the SADNB 2×2 OADM from FIG. 11 by always incorporating the 1×2 and 2×1 modules 1111–1114 and three 2×2 modules of eight possible combinations: (1101, 1103, 1105), (1101, 1104, 1105), (1102, 1103, 1105), (1102, 1104, 1105), (1101, 1102, 1103), (1101, 1102, 1104), (1101, 1103, 1104), and (1102, 1103, 1104). When any 2×2 TSS module is not retained, it has straight-through connections from the first input to the first output and from the second input to the second output. Also if TSS module 1105 is not used, the cascaded connection of a 1×2 module and a 2×1 module (1111 and 1113, or 1112 and 1114) can be implemented by a single 2×2 module. The OADM of FIG. 8 utilizes 2×2 TSS modules (1102, 1103, 1105) while the OADM of FIG. 9 utilizes (1101, 1102, 1104) with the cascaded 1×2 module and 2×1 module implemented by a single 2×2 module (module 913 or 914 in FIG. 9). The 2×2 TSS module 1103, if used, can be replaced by a 2×2 space switch array 1002 (FIG. 10) in between the transmitters and the multiplexers to remove add-to-add crosstalk. A similar arrangement can be applied to remove drop-to-drop crosstalk on the receiver side.

Figure 12:
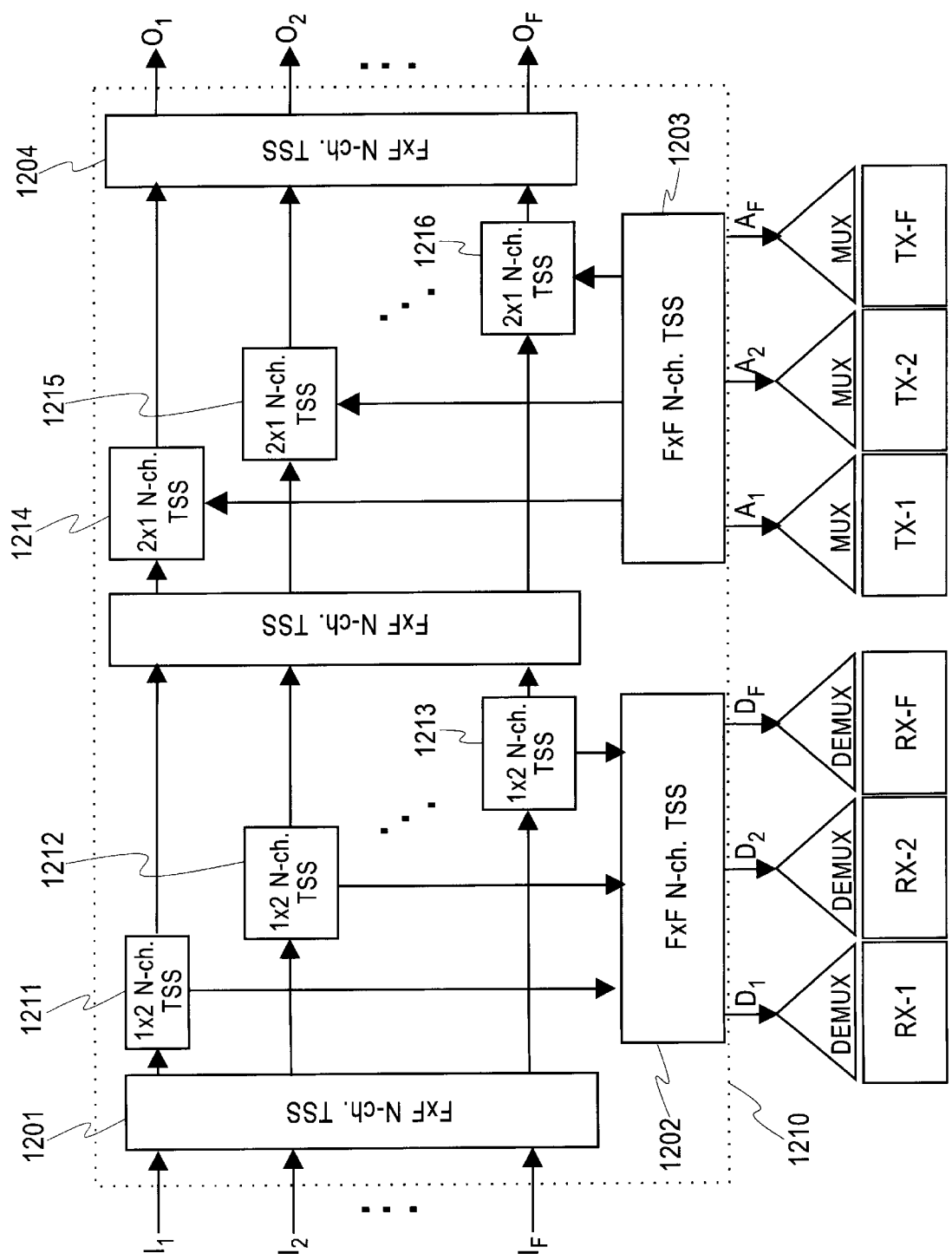
FIG. 12 describes a generic system configuration from which eight SADNB F×F (F 3) N-channel dynamic OADMs can be derived according to this invention.

Consider next an F×F N-channel dynamic OADM to be constructed according to this invention. The SADNB 2×2 N-channel dynamic OADMs in the generic configuration of FIG. 11 is extended to an F×F OADM configuration in FIG. 12 using F 1×2 drop-control TSS modules 1211–1213, F 2×1 add-control TSS modules 1214–1216, along with three F×F TSS modules for the functions of cross-drop, cross-add, and cross-pass. For the same reasons explained pertaining to FIG. 11, three out of the five F×F N-channel TSS modules 1201–1205 in FIG. 12 are needed of which at least one of modules 1201 and 1202 should be retained and at least one of modules 1203 and 1204 should be retained. Accordingly, there are eight possible configurations. One can verify that all F×F N-channel OADMs constructed in this way satisfy the conditions of SADNB if the F×F TSS modules 1201–1205 satisfy the conditions of strictly non-blocking (SNB) on a per-wavelength basis: (1) the F inputs are routed to F outputs without collision and (2) establishing a new connections from inputs to outputs has no effect on existing connections.

Figure 13:
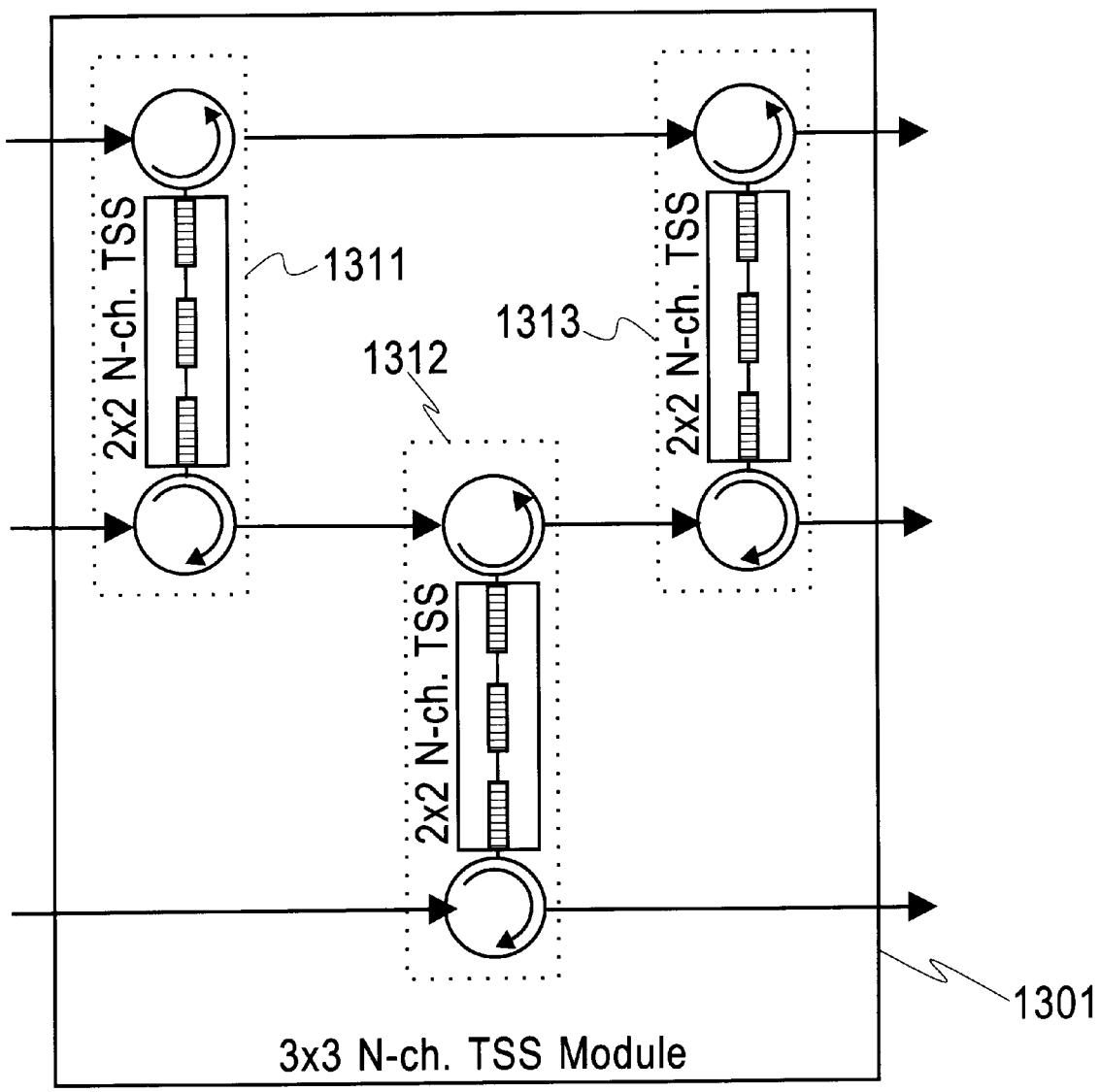
FIG. 13 is an example of strictly non-blocking (SNB) 3×3 N-channel tunable spectral switch (TSS) module.
Figure 14:
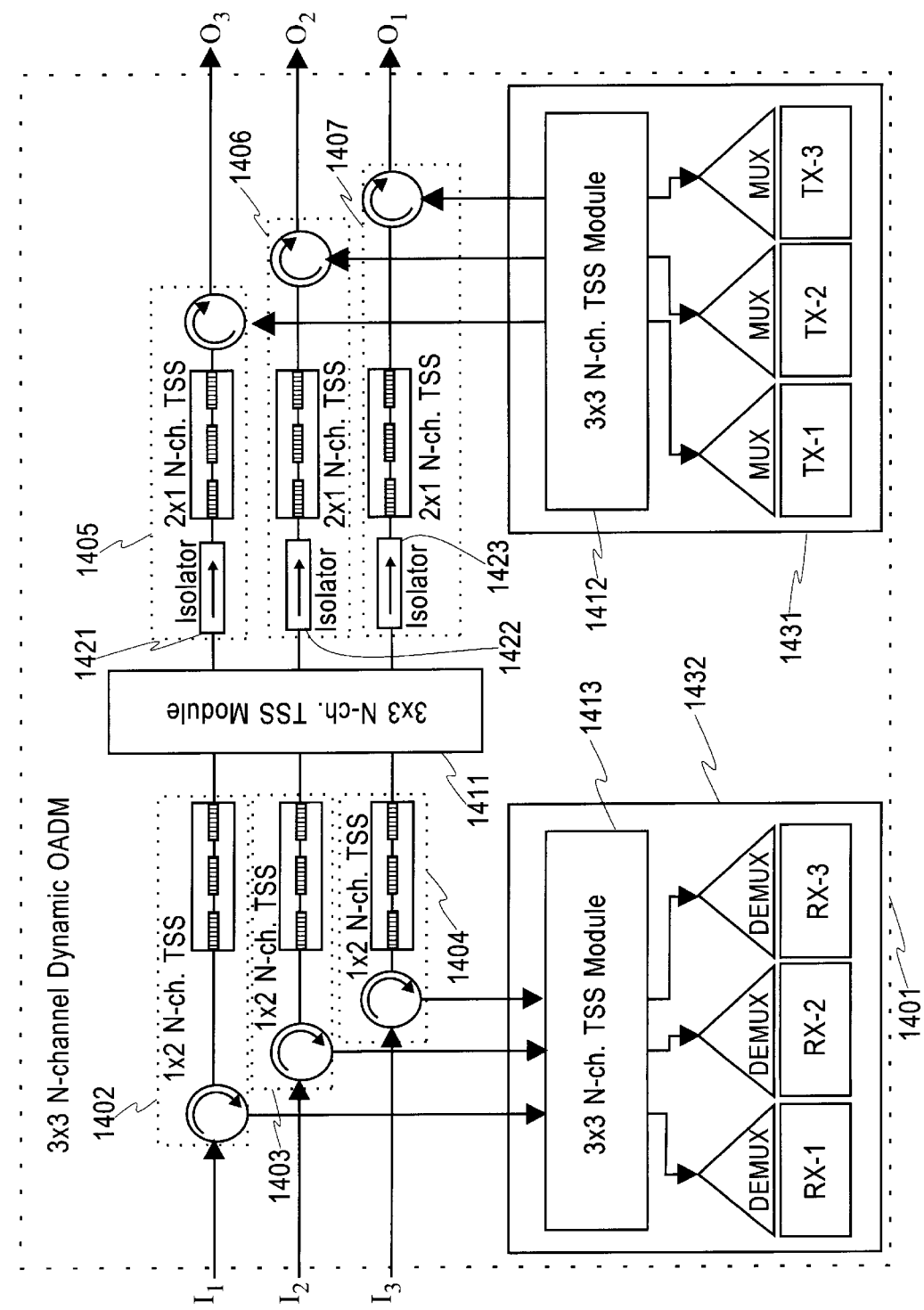
FIG. 14 is a system diagram of an embodiment of a 3×3 N-channel dynamic OADM that is constructed according to this invention.

FIG. 13 depicts a SNB 3×3 N-channel TSS module 1301 in accordance with the present invention. As depicted, the SNB 3×3 N-channel TSS module 1301 includes three 2×2 N-channel TSS modules 1311–1313. The system diagram of a 3×3 N-channel OADM obtained from FIG. 12 using (1202, 1203, 1205) 2×2 TSS modules is illustrated in FIG. 14. As also explained earlier, the 2×1 modules 1405–1407 each includes an equivalent isolator 1421–1423. The add-to-drop and drop-to-add crosstalk in the OADM 1401 are essentially removed under the same principle for the 2×2 OADM of FIG. 8. The add-to-add and drop-to-drop crosstalks could also be removed by modifying the switchable transmitter arrays 1431 and receiver arrays 1432 into an extended version (F=3) of the structure as illustrated by FIG. 10 (F=2).

Those skilled in the art will appreciate that a SADNB F×F N-channel dynamic OADM for F>3 can be constructed as depicted in FIG. 12 along with the rules for selecting three F×F N-channel TSS modules. The required SNB F×F TSS modules could be first constructed in one of the standard switch configurations: the cross-bar, the route/select, or the Clos networks. See, e.g., J. E. Midwinter, Photonics in Switching, vol. II, Systems, chapter 3, Academic Press, 1993.

When the F×F (F 3) dynamic OADM 1201 is incorporated in an optical mesh network, the two key advantages of minimized spectral filtering for pass channels and survivability upon power failure are preserved for pre-assigned pass-through connections. For example, for F=3, with the 3×3 TSS module 1411 assuming the configuration 1301 in FIG. 13, all channels will be routed from $I_1$ to $O_1$, $I_2$ to $O_2$, and $I_3$ to $O_3$ at node power failure. These three pass-through connections are also the paths with minimized spectral filtering and therefore can be pre-assigned to most frequent signal traffics. Various means for removing all four types of crosstalk apply equally well to the F×F OADM constructed according to this invention. Compared to the conventional implementation, all F×F OADMs for arbitrary F constructed according to this invention potentially have lower insertion loss for pass-through channels by using low-loss tunable reflection filters such as in-fiber UV-written Bragg gratings.

Figure 15C:
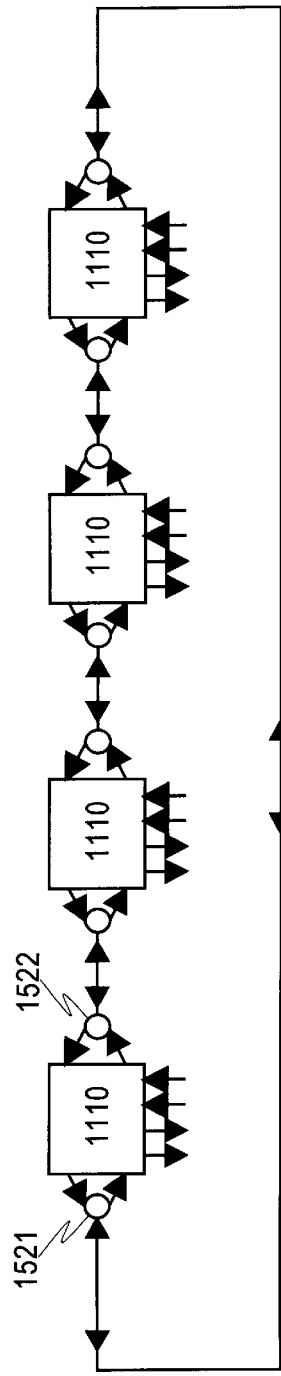

Various types of wavelength-routing networks can be constructed using the dynamic OADMs implemented according to this invention. Consider first, the simple single-fiber ring network configurations shown in FIG. 15a–15c. Each block in FIG. 15a–15c represents a dynamic OADM with adds and drops denoted by short arrows pointing to and away from the OADM, respectively. The unidirectional ring topology of FIG. 15a uses a 1×1 OADM 610 (FIG. 6) as the network node while the bidirectional ring of FIG. 15b uses two 1×1 OADMs 610 and two circulators 1511–1512 as the network node. Each 1×1 OADM in FIG. 15b is responsible for wavelength routing and add/drop in one direction while the two OADMs have no optical interaction within the node. By using 2×2 OADM 1110 (FIG. 11) and two circulators 1521–1522 as the node, FIG. 15c allows the functions of cross-add, cross-drop, and cross-pass. The ring networks of FIG. 15a–15c are reduced to linear bus networks if the fibers 1501–1503 are not connected.

Figure 16A:
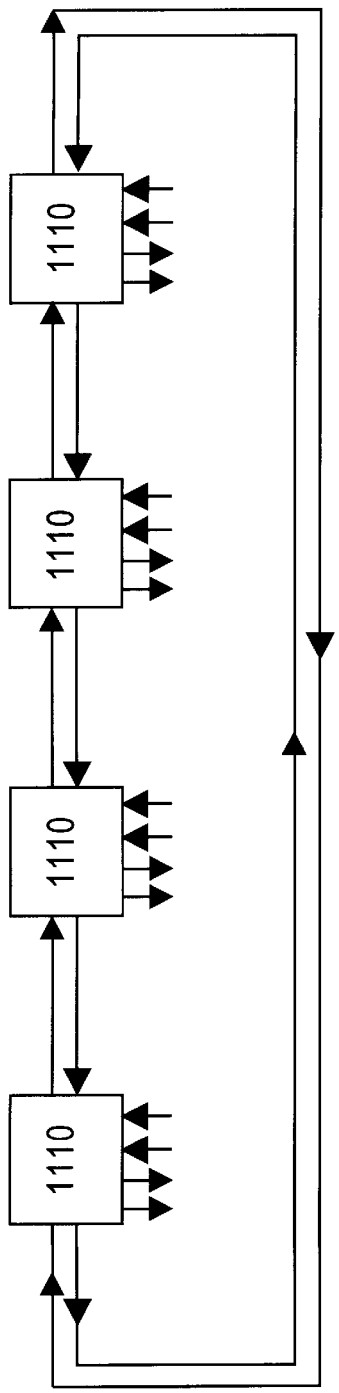
FIG. 16a and 16b illustrate, respectively, a dual-fiber ring (or bus) network comprising the 2×2 OADMs, and two connected single-fiber unidirectional networks comprising the 1×1 and 2×2 OADMs constructed according to this invention.

FIG. 16a illustrates a dual-fiber bidirectional ring network comprising 2×2 dynamic OADMs 1110 as the ring node. This is an all-optical equivalent to a SONET BLSR-2 in which half the capacity in each direction carries working traffic, and the other half carries protection traffic. Clearly, at each node, cross-add and cross-drop for either direction are possible by using the SADNB 2×2 OADMs 1110. It is obvious from FIG. 16a that, upon power failure, the node acts like straight-through fibers due to the feature of survivability of the OADM discussed earlier.

Figure 16B:
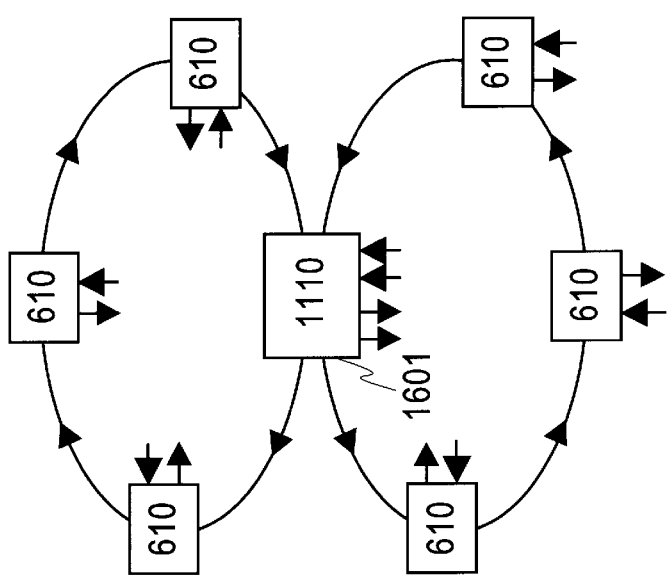
Figure 17A:
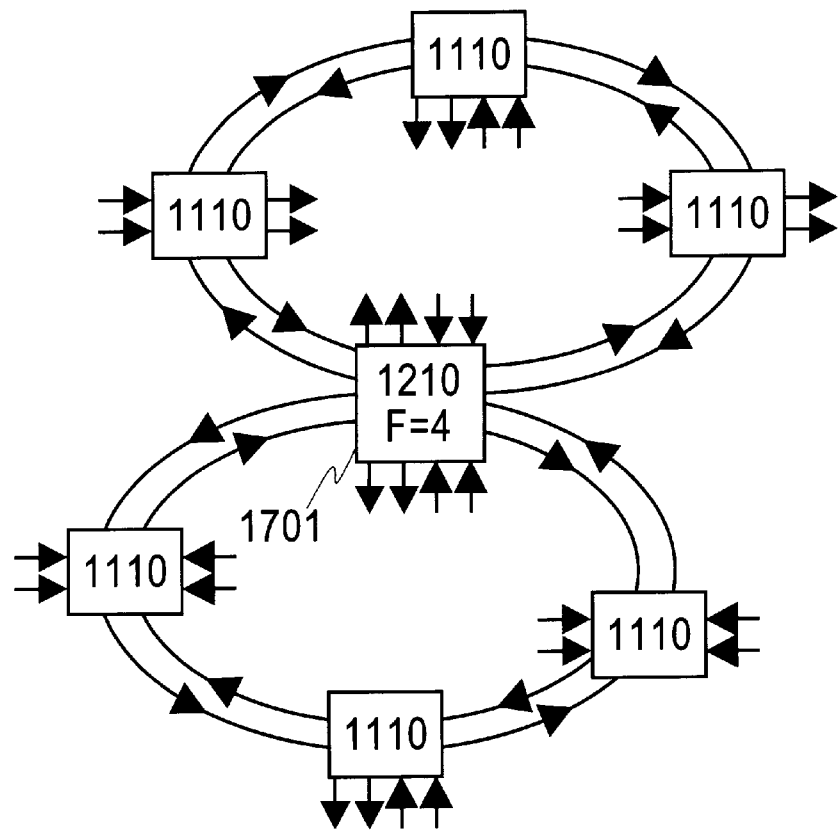
FIG. 17a and 17b illustrate, respectively, two connected dual-fiber bidirectional ring networks comprising 2×2 and 4×4 OADMs, and a dual-fiber bidirectional mesh network comprising the 2×2, 3×3, and 4×4 OADMs constructed according to this invention.
Figure 17B:
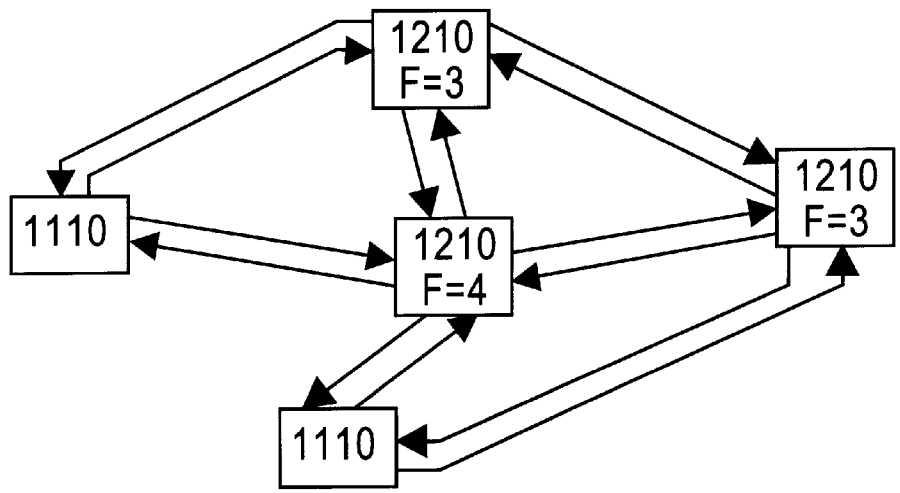

FIG. 16b illustrates two single-fiber unidirectional rings coupled at a cross-connect node 1601 using a 2×2 dynamic OADM 1110 so that traffic can be routed between rings. When each individual ring is dual-fiber bidirectional, the cross-connect node will be the 4×4 OADM 1701 of FIG. 17a (system 1210 for F=4 in FIG. 12). Finally, a wavelength-routing mesh network is illustrated in FIG. 17b where the network nodes can have different degrees (F=2, 3, or 4).

Now that the invention has been described by way of a preferred embodiment, with alternatives, various modifications and improvements will occur to those of skill in the art. Thus, it is understood that the detailed description should be construed as an example and not as a limitation. The proper scope of the invention is defined by the appended claims.

We claim:

1. A F×F N-channel dynamic optical add/drop multiplexer (OADM) where F>=3, the OADM having F OADM input fibers and F OADM output fibers, comprising:

F 1×2 drop-control tunable spectral switches (TSS); F drop fibers; F add fibers;

a first 1×2 drop-control TSS having an input connected to a first OADM input, and a first output of the first 1×2 TSS connected to a first drop fiber;

a second 1×2 drop-control TSS having an input connected to a second OADM input, and a first output of the second 1×2 TSS connected to a second drop fiber;

a third 1×2 drop-control TSS having an input connected to a third OADM input, and a first output of the second 1×2 TSS connected to a third drop fiber;

F 2×1 add-control TSSs;

a first 2×1 add-control TSS having a first input connected to a second output of the first 1×2 drop-control TSS; a second input of the first 2×1 TSS connected to a first add fiber; and an output of the first 2×1 drop-control TSS connected to a first OADM output;

a second 2×1 add-control TSS having a first input connected to a second output of the second 1×2 drop-control TSS; a second input of the second 2×1 TSS connected to a second add fiber; and an output of the second 2×1 TSS connected to a second OADM output;

a third 2×1 add-control TSS having a first input connected to a second output of the third 1×2 drop-control TSS; a second input of the second 2×1 TSS connected to a third add fiber; and an output of the second 2×1 TSS connected to a third OADM output; and at least three F×F tunable spectral switches (TSS) having F inputs and F outputs, where F>=3, selected from the group consisting of:

(a) a first F×F TSS interposed between one of: (i) the two 1×2 drop-control TSSs and the OADM input fibers, and (ii) the first outputs of the 1×2 drop-control TSSs and the drop fibers; a second F×F TSS interposed between one of: (i) the two 2×1 add-control TSSs and the OADM output fibers, and (ii) the second inputs of the 2×1 add-control TSSs and the add fibers; a third F×F TSS interposed between the 1×2 drop-control TSSs and the 2×1 add-control TSSs;

(b) a first F×F TSS interposed between the two 1×2 drop-control TSSs and the OADM input fibers; a second F×F TSS interposed between the first outputs of the 1×2 drop-control TSSs and the drop fibers; a third F×F TSS interposed between one of: (i) the two 2×1 add-control TSSs and the OADM output fibers, and (ii) the second inputs of the 2×1 add-control TSSs and the add fibers; and (c) a first F×F TSS interposed between one of: (i) the two 1×2 drop-control TSSs and the OADM input fibers, and (ii) the first outputs of the 1×2 drop-control TSSs and the drop fibers; a second F×F TSS interposed between the two 2×1 add-control TSSs and the OADM output fibers; and a third F×F TSS interposed between the second inputs of the 2×1 add-control TSSs and the add fibers.

2. The F×F N-channel OADM of claim 1, each TSS comprising:

tunable reflection filter (TRF) routing means for dynamically routing a pass-through wavelength from the input fiber to the output fiber.

3. The OADM of claim 2, wherein said tunable reflection filter (TRF) routing means comprises F×F TSS means for cross-passing an input channel on any input fiber to any output fiber.

4. The OADM of claim 2, wherein said tunable reflection filter (TRF) routing means comprises means for reducing add-to-drop and drop-to-add crosstalk.

5. The F×F N-channel OADM of claim 1, further comprising:

drop-control means, coupled to the TRF routing means, for dropping a channel from an input fiber to a drop port; and add-control means, coupled to the TRF routing means, for adding a channel from an add port to an output fiber.

6. The OADM of claim 5, wherein said drop-control means comprises switchable receiver array means for cross-dropping any input channel to any drop port.

7. The OADM of claim 5, wherein said add-control means comprises switchable transmitter array means for cross-adding said any input channel to any output fiber.

8. The OADM of claim 5 wherein said add-control means comprises coupler means for reducing spectral filtering on an ADD signal.

* * * * *